United States Patent

[11] 3,600,673

| [72] | Inventor | Stephen J. Kohke<br>Bridgewater Township, Somerset County, N.J. |
|---|---|---|
| [21] | Appl. No. | 841,943 |
| [22] | Filed | July 15, 1969 |
| [45] | Patented | Aug. 17, 1971 |
| [73] | Assignee | Thomas & Betts Corporation<br>Elizabeth, N.J. |

[54] SEQUENTIALLY STEPPED, TERMINATION INDICATING MULTICONDUCTOR CHECKING AND TESTING APPARATUS
13 Claims, 7 Drawing Figs.

[52] U.S. Cl. .................................................. 324/51, 324/66, 324/73
[51] Int. Cl. ...................................................... G01r 31/02
[50] Field of Search .......................................... 324/51, 73, 66

[56] References Cited
UNITED STATES PATENTS

| 2,810,881 | 10/1957 | Daily | 324/73 X |
| 2,814,774 | 11/1957 | Wong | 324/73 X |
| 2,869,076 | 1/1959 | Evans et al. | 324/73 X |
| 2,892,153 | 6/1959 | Neill | 324/66 X |
| 3,050,680 | 8/1962 | Fox | 324/51 |
| 3,197,695 | 7/1965 | Wingfield | 324/73 X |
| 3,514,552 | 5/1970 | Smith | 324/66 X |

*Primary Examiner*—Gerard R. Strecker
*Attorney*—David Teschner

ABSTRACT: An apparatus useful in the assembly and testing of the multiconductor cable assemblies which in a first mode of operation indicates the path for each conductor and indicates the path for each succeeding conductor only after such conductor has been properly terminated. In a second mode of operation a completed cable assembly may be checked out to determine whether each of its conductors properly extends between its desired terminators. In a further mode of operation each conductor may be checked against the remaining conductors of the cable assembly in order to insure absence of shorts between such conductors and the remaining conductors of the cable. Various indicators are provided to indicate the particular conductor under test, to indicate whether or not termination has been properly made and if a short exists. Further, test procedures built into the apparatus prevent the device from further functioning where conditions exist either due to a misterminated conductor or by the presence of a short between a selected conductor and the remaining conductors of the cable.

INVENTOR.
STEPHEN J. KOHKE
BY
ATTORNEY

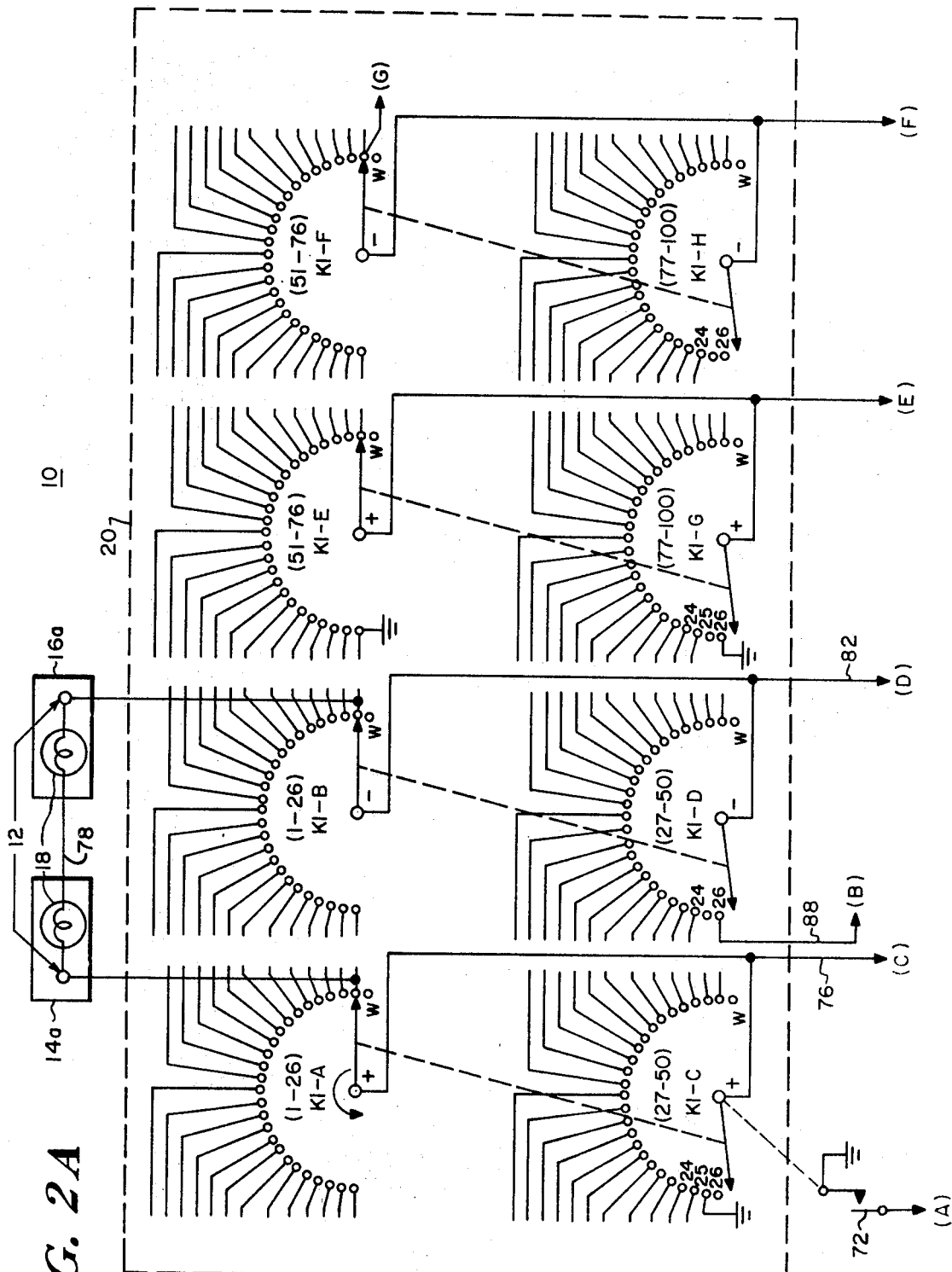

INVENTOR.
STEPHEN J. KOHKE
BY
ATTORNEY

SEQUENTIALLY STEPPED, TERMINATION INDICATING MULTICONDUCTOR CHECKING AND TESTING APPARATUS

BACKGROUND OF THE INVENTION

1. Field of the Invention

The invention is directed to the field of comparing and testing the conductors of cables used in the interconnection of electronic equipment. Such cables are necessary to provide proper signals between component portions of the electronic equipment and to provide the necessary power for their operation. The device herein may also be employed in the assembly and testing of other equipment or where it is necessary to extend a conductor from a first point to a second point and ensure that the conductor is properly installed.

2. Description of the Prior Art

Some prior art devices will test already completed cable assemblies by the process known as "ringing out" or by comparison with a completed assembly which is known to be correct. In the first of these procedures, known as "ringing out," one end of a conductor to be checked is coupled to ground and test set employing a battery and indicator such as a light, or buzzer, is employed to search out the conductor end that establishes a complete path from ground through the battery and indicator causing the indicator to operate. A check must then be made of assembly drawings to see that the conductor extends between the desired terminal points. In the event that a multipin connector has been assembled to each end of the conductor and is found that an individual conductor, within the cable, has been assembled between two incorrect terminal pins, it is necessary to disassemble a large portion of the cable in order to correct the error made.

In the comparison technique each conductor of the cable must be compared against a similar conductor of a cable which has already been assembled and checked out and found accurate. Again, should it be necessary to change the location of a conductor, with respect to a pin of a multipin connector, a large portion of the connector must be disassembled in order to permit such correction to be made due to the close placing of individual conductors within such a multipin connector. No device is known which will aid in the original fabrication of the cable assembly by indicating the necessary terminal points of each of the conductors which make up the cable assembly and which permits making the cable assembly in a totally error-free manner.

SUMMARY OF THE INVENTION

The invention is directed to a multiconductor, multitest apparatus which seeks to overcome the difficulties noted above with respect to prior art devices by providing an apparatus which will aid in the initial assembly of conductors in a multiconductor assembly and which will permit their subsequent inspection for correctness of assembly and for shorts between individual conductors and the remaining conductors of the cable assembly. The apparatus consists of a plurality of pairs of terminators, each of which has its individual indicator thereon. A selector arrangement selects prescribed pairs of terminators and causes their indicators to indicate the terminations of individual conductors, and in addition indicators may be provided to indicate the path which the conductor must follow from one terminator to the second terminator of the pair. A checking device will then be employed to determine when a conductor has been properly placed between the terminators and cause the advancement of a sequencing means which will cause the selector to then select a further pair of terminator devices. A signal device is provided to indicate that a proper connection has been made and a delay is incorporated in order to ensure that the sequencing mechanism will not advance until after the testing apparatus has indicated that a proper connection has been made between the desired terminator pairs. A position indicator is connected to the selector to indicate the particular terminator pairs which are then under test. In a further mode of operation, terminators may be checked in rapid sequence to inspect an already assembled cable assembly. Finally, in a further mode, individual conductors may be checked against the remaining conductors of the cable to determine whether or not a short exists between such conductors and the remaining conductors of the cable assembly. It is therefore an object of this invention to provide an improved multiconductor, multitest apparatus.

It is yet another object of this invention to provide an improved multiconductor, multitest apparatus which will indicate terminators for the respective ends of each conductor in sequence.

It is still another object of this invention to provide an improved multiconductor, multitest apparatus which will indicate terminations of an individual conductor of a multiconductor cable and indicates the path to be followed by the conductor from one terminator to its mate.

It is still another object of this invention to provide an improved multiconductor, multitest apparatus wherein the respective terminations of individual conductors of a multiconductor cable are indicated and which will only indicate a further path of terminating devices upon the proper installation of the conductors between the previously indicated pair of terminator devices.

It is still another object of this invention to provide an improved multiconductor, multitest apparatus which can be employed for the inspection of a completed multiconductor cable assembly.

It is yet another object of this invention to provide an improved multiconductor, multitest apparatus which can be used to check individual conductors of a multiconductor cable assembly against the remaining conductors of such assembly to determine the presence, or absence, of shorts therebetween.

It is yet another object of this invention to provide an improved multiconductor, multitest apparatus which can be selectively advanced in order to perform various tests upon individual conductors of a multiconductor cable assembly.

Other objects and features of the invention will be pointed out in the following description and claims and illustrated in the accompanying drawings, which disclose, by way of example, the principles of the invention and the best mode which has been contemplated for carrying it out.

BRIEF DESCRIPTION OF THE DRAWING

In the drawings in which similar elements are given similar reference characters.

DESCRIPTION OF THE PREFERRED EMBODIMENTS

Figure 1:
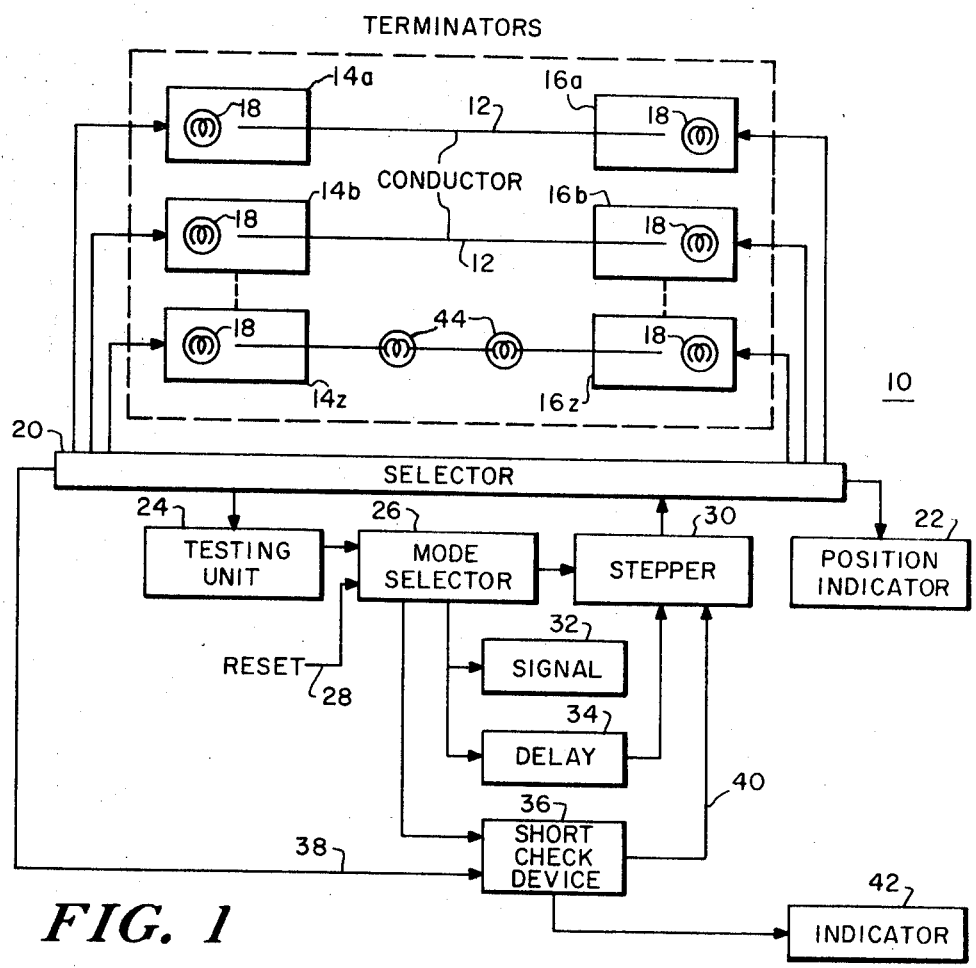
FIG. 1 is a block diagram of a multiconductor, multitest apparatus constructed in accordance with the concepts of the invention.

Turning now to FIG. 1 there is shown a multiconductor, multitest apparatus 10 constructed in accordance with the concepts of the invention. A plurality of pairs of terminators are provided to receive conductors 12 which are extended from a first member 14 of the pair to a second member 16 of the pair. However, it should be noted that the order of installation to the terminators of each pair is arbitrary. In FIG. 1 a conductor 12 is shown extending from the terminator 14a to the terminator 16a. As the operation continues, additional conductors 12 will be installed between the terminators 14b and 16b, etc. Each of the terminators, 14 and 16 will have an indicator such as the lamp 18 whose function will be described below and is coupled by conductor 78 to lamp 18 of the other terminator of the pair. Each of the terminators 14 and 16 will be connected by suitable conductors to a selector 20 which will select individual terminators 14 and 16, such as the pair 14a and 16a. Based upon the manner of operation of the apparatus 10, the selector 20 may select any pair of terminators 14 and 16 in sequence, or at random. Coupled to the selector 20 is a position indicator 22 such that the particular pair of terminators 14 and 16 then under test is indicated. Also coupled to the selector 20 is a testing unit 24 which is employed to determine whether or not a correct assembly has been made of a conductor 12 between a selected pair of terminators 14 and 16. Coupled to the testing unit 24 is a mode selector 26 which will establish the three basic modes of operation of the apparatus 10, that is, continuity, inspect and short check. Further, a reset signal applied on the line 28 to the mode selector 26, will reset the entire apparatus 10, prior to the initiation of the operation of the apparatus 10, or as desired. The mode selector 26 is coupled to stepper 30, which in turn is coupled to the selector 20 to affect the selection of particular terminators 14 and 16 in accordance with the desired testing procedure. Also coupled to the mode selector 26 is a signal 32 which may be visual as with a series of lights, or audible, as with a buzzer, alarm, or other similar device. A delay 34 is coupled between the mode selector 26 and the stepper 30 to ensure that a further selection of terminator pairs 14 and 16 will not be made until the proper testing procedure has been accomplished by the testing unit 24. Further, coupled to the mode selector 26 is a short check device 36 which is also coupled to the selector 20 by a line 38 and to the stepper by further line 40. Coupled to the short check device 36 is an indicator 42 which will indicate the presence of shorts between the conductor 12 then under test and the remaining conductor of the cable assembly.

In order to better understand the operation of the device a summary will now be given of each of the modes of operation of the multiconnector, multitest apparatus 10. In a first mode, the reset mode, a reset signal will be introduced via the line 28 to the mode selector 26 to cause the stepper 30 to advance to a home position and reset the selector 20 to select a first set of terminators such as the terminators 14a and 16a. All devices within the apparatus 10 will be reset to their initial conditions. With the mode selector 26 in the continuity position, the indicators 18 on the terminators 14a and 16a will be lit so as to show the terminal points for a first conductor 12 to be inserted therebetween. The terminator pair selected will be indicated by position indicator 22. If the path of the conductor is to be long and intricate, additional lamps, such as 44, may be coupled between the lamps 18 to show the path for the conductor to follow as illustrated with respect to terminators 14z and 16z. The path lamps 44 may be coupled in series, as shown, or in parallel or series parallel as desired. Once the lamps 18, of the first terminator pair 14a and 16a are lit, they will stay in that condition until the conductor 12 has been inserted between the terminators 14a and 16a and a good electrical connection made therebetween. Each of the terminators 14 and 16 may be provided with proper clips, clamps, screw terminals, or the like in order that a proper assembly be made between the conductor 12 and the terminators 14 and 16. Once the connection of the conductor 12 has been made, a signal will be sent from the terminators 14a and 16a to the selector 20 and thence to the testing unit 24 to determine whether a proper electrical path has been established between the terminator pair 14a and 16a and the conductor 12 at which time a check signal will be issued by testing unit 24 to the mode selector 26. Mode selector 26 will issue a signal to the signal unit 32 which will provide an audible, or visual, signal indicating that a proper connection has been made. Further, the mode selector 26 will provide a signal to the delay 34 which after a prescribed interval will provide a signal to the stepper 30 to cause advancement of the selector 20 to select the next set of terminators 14 and 16. In the event that an improper termination of the conductor 12 was made the testing unit 24 will have failed to provide a check signal and the selector 20 will remain in the particular position it was then in. Assuming that a proper installation of the conductor 12 was made, multiconductor, multitest apparatus 10 will advance to the next selected position, selecting the next pair of terminators 14 and 16 and will cause the position indicator 22 to advance to indicate this further position. Lamps 18 of the next terminator pair, such as 14b and 16b, will then be ignited to indicate the path for the next conductor 12.

In the inspect mode, the signal 32 and delay 34 will be disabled and a more rapid sweep of each of the terminator pairs 14 and 16 will be permitted. In the event of an improper termination of a conductor 12 the multiconductor, multitest apparatus 10 will stop at the faulty conductor 12 and will indicate its existence by the fact that the lamps 18 on the terminators 14 and 16 will be ignited to indicate that a fault exists. Further, the position indicator 22 will show the locations then under test.

Finally, in the short check mode, individual conductors 12 will be checked against all of the remaining conductors of a cable. Only upon the absence of a short will the stepper 30 be permitted to advance to test the next conductor against all remaining conductors of the cable. Should a short exist a short check device 36 will cause the indicator 42 to sound an alarm, light, or make any other appropriate indication depending upon the type of indicator 42 employed.

Figure 2:
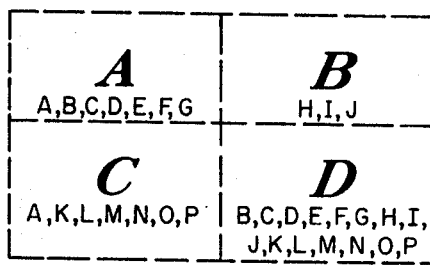
FIG. 2, composed of FIGS. 2A through 2D and arranged as shown in FIG. 2, is a schematic of the apparatus of FIG. 1.

Turning now to FIG. 2 a schematic diagram of the multiconductor, multitest apparatus 10 of FIG. 1 is shown. It should be understood that although the apparatus 10 shown has a selector 20 constructed of a multilevel switch device a mode selector 26 constructed of a switch device and testing unit 24, as well as other portions of the device, constructed of relay devices, the entire apparatus can be fabricated from semiconductor or other electronic devices without departing from the spirit of the invention. A DC power supply 50 of conventional type is coupled through a switch, such as 52, and the fuse 54 to a source of AC current 56, an indicator 58 will be employed to show that the power supply 50 is on. The output of the DC power supply 50 is applied via a line 60 to the remaining portions of the apparatus 10. It is assumed, for the purposes of this explanation, that the signal placed upon the line 60 will be positive of a value of approximately 24 volts. However, if desired, negative polarity may be employed and the voltage applied to the line 60 may be varied in accordance with the type of devices employed in the apparatus 10. Alternatively, it is possible to employ both the positive and negative outputs of the DC power supply 50 in alternate fashion in order to increase the capacity of the apparatus 10 in a manner that will be described below. If desired an AC power supply may be employed.

The multiconductor, multitest apparatus 10 will now be considered in the continuity check mode. In order to perform the continuity check, the mode selector 26 will be set to the continuity position. Positioned so, the wiper of switch S2, on the lower switchbank, is in contact with contact H and on the upper switchbank, in contact with contact D in the position shown in FIG. 2. As a result of the position of the switch S2, the signal on the line 60 will be applied via the contacts E and H to the terminal 7 of the continuity relay K2 which constitutes the testing unit 24. The terminal 2 of the relay K2 is coupled by a line 74 in closed contacts 5 and 6 of the relay K5 and 76 to the wiper of the switch K1A, which is part of the selector 20. It should be noted that the switch portions K1A through K1P have wipers which are ganged together and are operated by means of the stepper 30 in a manner to be described below. In order to obtain maximum capacity from the switch arrangement each of the 26 contacts of the switchbanks has a complementary pair of 26 additional contacts, with the wipers set at 180° with respect to one another in order to employ the full 360° revolution of the wiper and thus provide for 50 contact positions for a single revolution of each wiper. The device can be fabricated employing switchbanks having a greater number of contacts if such were desired. As shown, the wiper of switch K1A is in contact position 1. In a similar manner the wiper of switch K1B is also in its number 1 position. The switch position K1A1 is in turn coupled to a terminator 14a which has associated therewith a lamp 18 as was described above. A further line 78 connects to the lamp 18 of the terminator 16a, which in turn is coupled to contact 1 of the switch bank K1B, which in turn is coupled via the lines 80, 82 and 84 to the contact 3 to the relay K5. Relay K5 contact 3 is closed to contact 1 which in turn is grounded providing a ground path to terminal 2 of the relay K2. By the selection of the proper values of the resistor R2 and R3 shunting the terminals 2 and 7 of the relay K2 coil, sufficient current may be permitted to pass through the lamps 18 to cause them to be ignited but prevent the relay K2 to operate.

The apparatus 10 will remain in this condition, that is with the lamps 18 of the terminators 14a and 16a ignited, but the relay K2 inoperable until such time as a conductor, such as 12, is placed across the terminators 14a and 16a. As a result of the shunting of the lamps 18 of the terminators 14a and 16a, the current through the coil of the relay K2 will increase to the point that it is able to operate and close its contacts. Ground is now applied from contact 1 to contact 3 of the relay K2 via the line 86 to the closed interrupter springs 5 and 6 of the relay K1 to the terminal 5 of the relay K6. Relay K6 receives at terminal 1 the positive signal from the line 60 via contacts A and D of the upper bank of the switch S2. After the capacitor C5 shunting the coil of the relay K6 is charged, relay K6 is permitted to operate. The capacitor C5 and the resistor R5 in shunt of the coil of the relay K6 constitute the delay in the 34 of the apparatus 10. Once the relay K6 operates the positive signal from the line 60, via the H contact of the switch S2, is applied via the closed contacts 2 and 3 of the relay K6 to apply to line 70 and then to terminal 1 of the relay coil K1 of the stepper 30. Terminal 2 of the coil of the relay K1 is grounded via the closed contacts 1 and 4 of the relay K3, the closed contacts 1 and 4 of the reset relay K3 now inoperative. This causes the operation of the relay K1 to set the stepper 30. Operation of the relay K1 also causes the interrupter springs 5 and 6 to separate thereby breaking the ground path to terminal 5 of the coil of the relay K6 and causing K6 to deenergize. The deenergization of relay K6, deenergizes relay K1 by removing the signal on line 70. When K1 deenergizes it causes the stepper 30 to advance the wipers of switchbanks K1A and K1B from their first contacts to their second contacts. When wipers break contact with the contacts of K1A and K1B relay K2 is deenergized. When the wipers of switchbanks K1A and K1B come to the positions K1A2 and K1B2 a high resistance circuit is established again to permit current to flow through the coil of relay K2 at a level preventing the energization of relay K2. Thus the coil of relay K2, with its attendant resistors R2 and R3, is sensitive to the level of current flowing between its contacts 2 and 7 and the switchbanks K1A and K1B and operates as the testing unit 24 of FIG. 1.

To summarize the continuity mode once the apparatus 10 has been set with its mode selector 26 in the continuity position, lights 18 on the associated pair of terminators 14a and 16a are ignited while the device remains in a quiescent state. On the application of an external conductor, such as 12, between the terminators 14a and 16a, the current through the relay K2 increases causing relay K2 to operate and provide a checking signal to the delay 34, which after a prescribed period of time operates the relay K6. The operation of relay K6 in turn operates relay K1 causing interrupter springs 5 and 6 to open. K6 deenergizes, K1 deenergizes, causing the advancement of the stepper 30 to choose a further pair of terminators 14 and 16 and deenergizing the test relay K2 to bring the apparatus 10 to a condition to operate for a further step. The set of lights 18 of the second terminators 14b and 16b will be ignited awaiting the application of a further conductor 12 therebetween. The step-by-step operation just described will continue through the contacts 1 through 26 of the switchbanks K1A and K1B.

For the 27th position, the wipers for the switchbanks K1C and K1D, displaced 180° with respect to the wipers on the banks K1A and K1B, will begin to contact their respective first contacts. Contacts 1 through 24 of switchbanks K1C and K1D provide the remaining contacts to 50 for the terminators 14 and 16. At contact position number 26, of switchbank K1D the ground at closed contacts 11, 12 and 13 of the relay K5 is applied via the line 88 to terminal 15 of the right coil of the relay of K5. Terminal 13 of the right coil of relay K5 is also coupled to contact E of the switch S2 and receives the signal on the line 60 from the DC power supply 50. As a result, the right-hand portion of the relay K5 will operate causing its contacts to close and causing the contacts associated with the left-hand portion of the relay K5 to open, thus removing ground from the wipers associated with the switchbanks K1B and K1D and applying ground via the closed contacts 1 and 2 of the right-hand portion of the relay K5, the line 90 to the wipers of the switchbanks K1F and K1H. The apparatus 10 will now function for the next 26 pairs of terminators 14 and 16 coupled to the switchbanks K1E and K1F and will switch for the positions 77 through 100 to the switchbanks K1G and K1H, as was described above with respect to the switch to switchbanks K1C and K1D.

To indicate that a successful installation of a conductor 12 has occurred signals such as 32 may be employed. The signal, as stated above, may be an audio or visual type of signal. Upon the operation of the check circuit 24, that is the relay K2, the contacts 6 and 8 will be closed applying the positive signal from the contact D of the upper bank of the switch S2 to be conducted via the closed contacts 6 and 8 of the relay K2 and the line 92 to operate the signal 32. In the event that a proper contact not be made between the respective terminators 14 and 16 of selector 20, the current will not rise in the coil of the relay K2 to permit its operation and the signal 32 will not be operated. Therefore, it will only operate in response to the proper test conditions as shown by the current level through the coil of the relay K2. The particular position of the selector 20 is shown by means of the position indicator 22. Position indicator 22 consists of additional switchbanks coupled to the same mechanical drive as the wipers of the switchbanks of the selector 20. Switchbanks K1N and K1P provide the unit input to indicator display 100 whereas the switchbanks K1J, K1K, K1L and K1M provide the tens order inputs. Switchbank K1J provides the tens order inputs for switchbanks K1A and K1B while switchbank K1K operates with switchbanks K1C and K1D. Similarly, switchbank K1L operates with K1E and K1F and switchbank K1M operates with switchbanks K1G and K1H. When the relay K5 is operated so that K5's left-hand portion is operated contacts 7 and 9 are closed operating the wipers of the switchbanks K1J and K1K to indicate the tens position for the values 1 through 50. When the right-hand portion of the relay K5 is operated contacts 7 and 8 are closed to operate the relay banks K1L and K1M for the tens position for numbers from 51 to 100. The outputs of the switchbanks K1J to K1M are fed through an input V2 to the indicator display 100. Regardless of the position of contact 7 of relay K5 one of the switchbanks K1N and K1P depending upon the wiper positions will be connected so as to provide an input to the V1 input of the display indicator 100. It should be noted that the wipers of the switchbanks K1J to K1M are coupled to the supply 50 via contact 7 of relay K5 whereas the wipers of switchbanks K1N and K1P are directly coupled to supply 50. In this manner the indicator display 100 will continually indicate the position of the selector 20. Indicator 100 may be glow tubes, neon indicators or a digital display.

Figure 3:
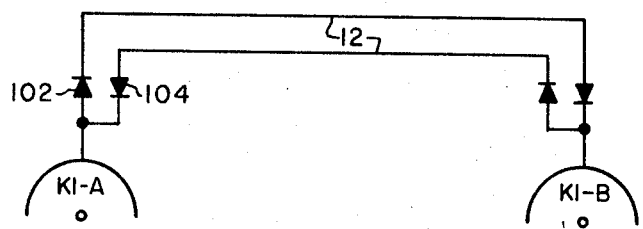
FIG. 3 shows a modification, in schematic, of the switchbanks of FIG. 2 to increase the capacity thereof.
Figure 2B:
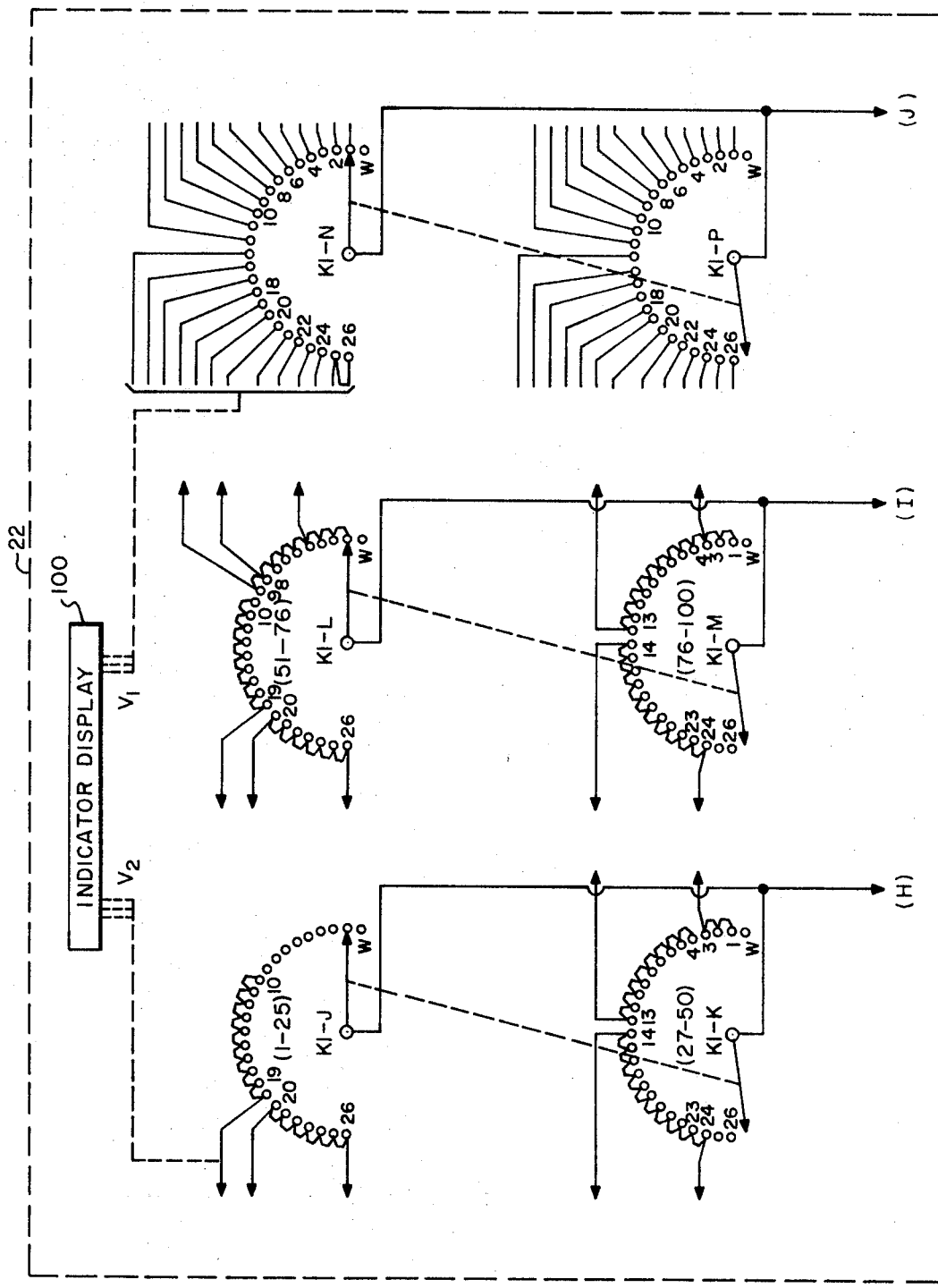
Figure 2C:
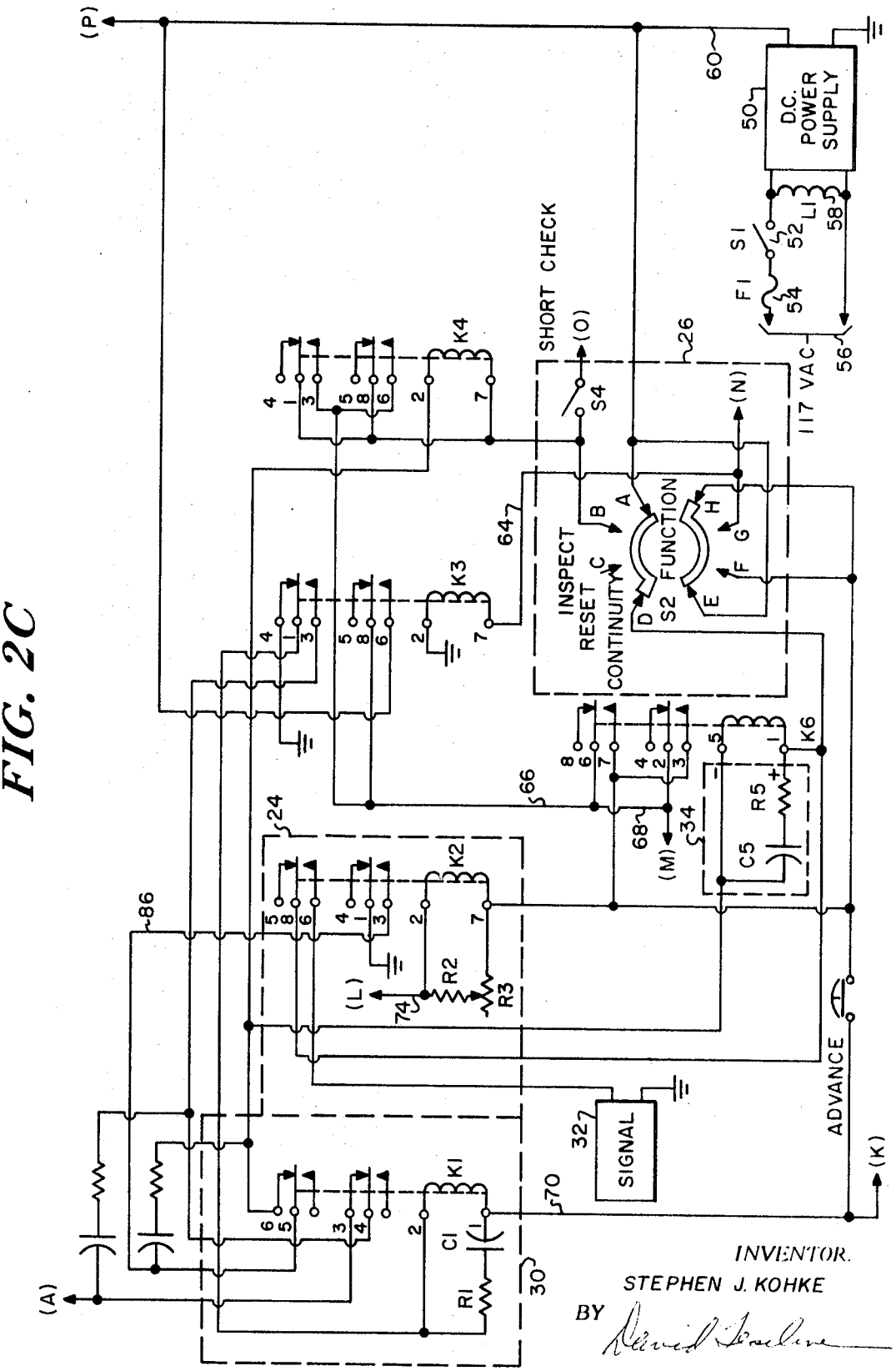
Figure 2D:
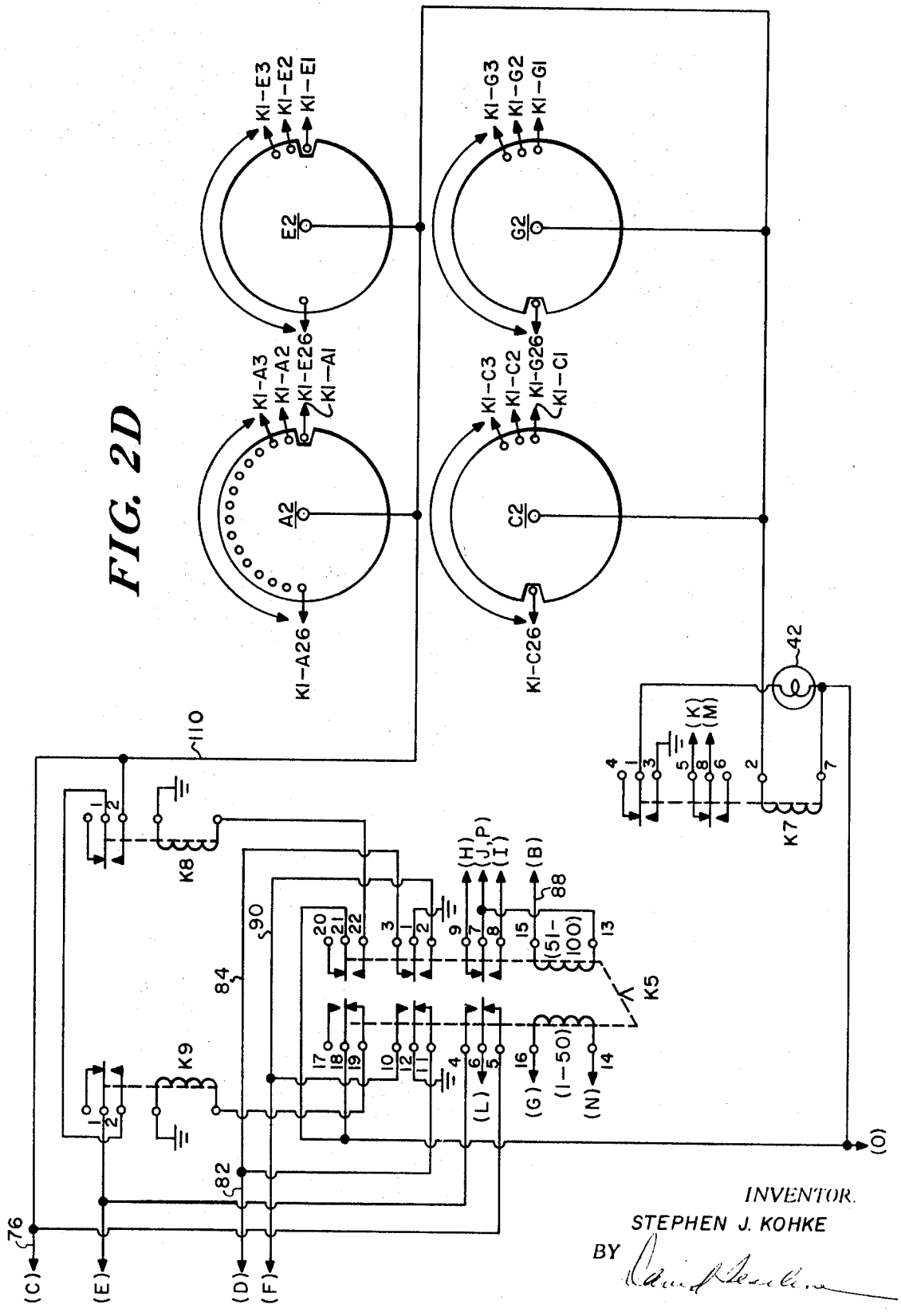

To this point the functioning of apparatus 10 having 100 positions as continuity checker has been described. To use it for more, the conductors over 100 would be considered as a second 100 and the apparatus 10 used as above. If it is desired, however, to increase the device to directly accommodate 200 positions then each of the contacts of the various switchbanks will be coupled to terminators 14 and 16 through oppositely poled diodes, such as diodes 102 and 104 of FIG. 3. In that case, after one complete operation of the switchbanks K1A through K1H, the polarity of the output of the DC power supply 50 may be reversed by means of a switch, or the like. The entire operation is gone through again employing the oppositely poled diodes thus increasing the ability of apparatus 10 to check out 100 pairs of conductors to 200 pairs of conductors.

Considering now the reset mode, the manner in which apparatus 10 is prepared for its initial operation, or its return to the home position after a complete continuity check has been accomplished is described. Switch S2 of the mode selector 26 is now set in the reset position such that the wiper of the lower switchbank contacts the contact G whereas the wiper of the upper switchbank contacts the contact C. It can be seen that the contact C is open and thus the upper switchbank of the switch S2 will have no effect on the reset operation. The signal on the line 60 will pass via the contacts E and G to terminal 7 of the coil of the reset relay K3 whose other terminal 2 is grounded. As a result of application of the positive potential of line 60 to the terminal 7 of the coil of the relay K3, relay K3 will operate and cause its contacts to move to positions opposite those shown in FIG. 2. The complete manner of operation of the reset will depend upon the switchbank range to which apparatus 10 is set. For example, if it is in the range of terminators 51 to 100 on switchbanks K1E to K1H resetting will be accomplished when the wiper on the switchbank K1F reaches the number 1 contact. If it is in the 1 to 50 range reset will be accomplished when the wiper reaches contact 1 of switchbank K1A. First assuming that the switchbanks are in the range 1 through 50, the signal on the line 60 is applied via the closed contacts 8 and 6 of relay K3 lines 66, 68 and 70 to terminal 1 of relay K1 of the stepper 30. Ground is applied to terminal 2 of the coil of the relay K1 from the normally closed switch 72 which is grounded at one side and thence to interrupter springs 3 and 4 of the relay K1 as well as closed contacts 1 and 3 of the now operated reset relay K3. As soon as the relay K1 operates it will open the interrupter springs and contacts 3 and 4 thereof breaking the ground circuit and deenergizing the relay K1. The deenergization of the relay K1 will advance the stepper one position and cause the closure of the interrupter springs 3 and 4 which will cause a repeating of the previous operation until K1A returns to its number 1 contact causing switch K1C to operate switch 72 to remain open thus terminating further stepping at the home or number 1 contact.

If the switchbanks had been in the 51 to 100 range, recycling would continue until the wiper of switchbank K1E is in position 1 at which time switch 72 opens. A ground path exists via closed contacts 10 and 12 of relay K5 (right side of relay K5 is operated) position 1 of the switch K1F to terminal 16, on the left-hand coil of the relay K5, which receives at terminal 14 a positive signal from the DC power supply 50, via contact G of switch S2 of mode selector 26, causing the relay K5 to switch its position and operate the left-hand side thereof deenergizing the right-hand side; thus completing the reset cycle.

Assuming now that it is desired to check a cable assembly, either just assembled or one that has been previously assembled, the inspect mode may be employed without waiting for the normal sequence which occurs during the continuity check. The switch S2 of the mode selector 26 will be set to the inspect mode, in which case the wiper of the upper switchbank will contact contact B and the wiper of the lower switchbank will contact contact F. A signal from the DC power supply 50 is applied via line 60 through contact F of switch S2 to terminal 7 of the coil of the continuity relay K2. Terminal 2 is connected to ground through the closed contacts 5 and 6 of relay K5 and the shunt conductor 78 extending between the terminators 14 and 16 as above described with respect to the continuity check. However, since a conductor is already in place, between the terminators 14a and 16a sufficient current will be conducted through the coil of the relay K2 to cause the relay K2 to operate. The positive potential on the line 60 is applied via the contact B of switch S2 to terminal 7 of the inspect relay coil K4 whose second terminal 2 is coupled via interrupter springs 5 and 6 of the deenergized motor magnet relay K1 and the closed contacts 6 and 8 of the relay K2 which is now inoperative. The potential from contact B on the switch S2 is also applied via the closed contacts 1 and 3 of the operated relay K4 via lines 66, 68 and 70 to operate the motor magnet K1 of the stepper 30. As soon as the relay K1 operates and opens the interrupter springs 5 and 6 it causes relay K4 to open which in turn then causes the relay K1 to open and step the wipers. With the advanced position of the wiper a completed path exists again permitting the closure in the above-stated order of relay K2, relay K4 and relay K1 to advance the stepper and finally causing the opening in succession of the relays K4 and K1. This operation will continue so long as there are conductors assembled between terminators 14 and 16. However, should there be a conductor absent, sufficient current will not flow through the coil of the relay K2 to permit its operation. Relays K4 and K1 will not be permitted to operate thus the device will stay in the position which it occupies when the open or missing lead was found. The operation of inspect may be continued by completing the missing conductor 12 or if not desired by manually advancing apparatus 10 by the use of manual advance switch S3. Manual advance switch S3 may also be used to preset the apparatus 10 or to skip selected ones of the normal cycles of operation.

The final check which can be made with apparatus 10 is the short check. In the short check mode it is possible to check each conductor 12 against all the remaining conductors 12 of the cable assembly for shorts. The selector switch S2, of the mode selector 26, is placed in the reset condition to reset the apparatus 10 to its initial conditions as described above with respect to reset. Short check switch S4 is closed which applies the signal on line 60 via the closed contacts 18 and 19 of relay K5 (operated in its left side) to the coil of relay K9, the other side of which is grounded. The operation of relay K9 closes its contacts 1 and 2 coupling the wipers of switchbanks K1E and K1G via line 110 to the wipers of short check switches A2, C2, E2 and G2. The potential on line 60 is also applied to one terminal of relay K7 while the other terminal is connected to line 110. The line 110 remains electrically floating so long as a short does not exist. If a short is found line 110 is grounded causing relay K7 to operate. The closing of contacts 3 and 1 of relay K7 applies ground to one side of the short indicator 42 which also receives at its other side the potential on line 60. The opening of contacts 5 and 8 of relay K7 opens the path to relay K1 and prevents further stepping of stepper 30 to hold apparatus 10 at the shorted conductor. The manual switch S3 is employed to advance the operation to the next conductor 12 permitting normal cycling to continue.

After reset and the closing of switch S4, the selector switch S2 is set to the inspect mode so that each conductor 12 of the cable assembly may be checked in sequence. It should be noted that each of the wipers of the short check switches A2, C2, E2 and G2 is a disk with a notch cut out of its surface. The notch is so arranged that the contact opposite the notch is insulated from the disk while all other contacts are shorted to it. It should also be noted that the position of the notch corresponds respectively to the wiper positions of the switchbanks K1A, K1C, K1E and K1G. Further, the contacts of the short check switches A2, C2, E2 and G2 are each coupled respectively to the contacts of switchbanks K1A, K1C, K1E and K1G. By means of these connections all conductors 12 of the cable assembly are effectively held at the same floating electrical level except the conductor 12 then being inspected. In the event a short is found the floating electrical level is brought to ground and relay K7 is operated, closing its contacts. Short indicator 42 is operated to give an indication of the short and further stepping of stepper 30 is prevented due to the opening of contacts 5 and 8 of relay K7. In addition, the failure of a proper termination of the conductor 12 under test will cause relay K2 to open and further prevent the stepping of stepper 30. Manual reset switch S3 can be used to restart the short check mode once the defect has been cleared. Except for the presence of the additional short check mechanisms the operation proceeds as a normal inspect cycle. Relay K8 is operated and relay K9 rendered inoperative when the progression from terminators 1 to 50 to terminators 51 to 100 is made.

The embodiments of the invention in which an exclusive property or privilege is claimed are defined as follows:

1. An apparatus for the identifying and testing of a plurality of conductors comprising: a plurality of pairs of terminator devices; one of said pairs of terminator devices for each conductor to be identified and tested and arranged to receive a conductor therebetween; a plurality of pairs of visual indicators, each of said pairs being disposed adjacent and coupled to an associated pair of said terminator devices; selector means coupled to said terminator devices and said indicators for sequentially selecting said terminator device pairs and sequentially energizing said associated visual indicator pairs to positionally identify the physical location of an associated terminator pair prior to the receipt of a conductor therebetween; sequencing means coupled to said selector means to sequence said selector in accordance with a predetermined sequence; testing means coupled to said selector means and said sequencing means; said testing means responding to signals from said selector means to produce a check signal when a conductor has been correctly placed between a selected associated pair of terminator devices to operate said sequencing means to cause said selection means to select a further pair of terminator devices; and remote position indicating means coupled to said selector means whereby the pair of terminator devices selected is indicated at a position remote from said pair.

2. An apparatus so defined in claim 1, further comprising: delay means coupled to said testing means and said sequencing means and responsive to said check signal from said testing means to operate said sequencing means after a predetermined delay.

3. An apparatus, as defined in claim 1, further comprising: a test indicator means coupled to said testing means and responsive to said check signal for producing an indication that said check signal has been produced.

4. An apparatus, as defined in claim 2, further comprising: a test indicator means coupled to said testing means and responsive to said check signal for producing an indication that said check signal has been produced.

5. An apparatus, as defined in claim 3, further comprising: remote position indication means coupled to said selector means whereby the pair of terminator devices selected is indicated at a position remote from said pair.

6. An apparatus, as defined in claim 1, further comprising: mode selection means coupled to said testing means and said sequencing means; said mode selection means establishing the predetermined sequence of said sequencing means.

7. An apparatus, as defined in claim 4, further comprising: mode selection means coupled to testing means and said sequencing means; said mode selection means establishing the predetermined sequence of said sequencing means; said mode selection means when set in a first position permitting the operation of said delay means and said test indicator means and in a second position disabling said delay means and said test indicator means.

8. An apparatus, as defined in claim 7, wherein said mode selection means has a third position to reset said apparatus.

9. An apparatus, as defined in claim 1, further comprising: short checking means coupled to said selector means and said sequencing means; said short checking means checking said selected associated pair of terminator devices against all remaining pairs of terminator devices.

10. An apparatus, as defined in claim 7, further comprising short checking means coupled to said selection means, said mode selection means and said sequencing means; said short checking means being enabled when said mode selection means is in a third position to check said selected associated pair of terminator devices against all remaining pairs of terminator devices and advance said sequencing means if no short exists.

11. An apparatus, as defined in claim 10, further comprising: short indication means coupled to said short checking means.

12. An apparatus, as defined in claim 1, further comprising path indicators coupled to said selector means to indicate the path to be taken by a conductor between associated terminator devices of a selected pair of terminator devices.

13. An apparatus, as defined in claim 1, further comprising: manual control means coupled to said sequencing means to advance said sequencing means.